United States Patent [19]

Hara

[11] Patent Number: 5,460,437
[45] Date of Patent: Oct. 24, 1995

[54] SOLENOID VALVES FOR ANTILOCK BRAKE SYSTEM

[75] Inventor: Masahiko Hara, Atsugi, Japan

[73] Assignee: Unisia Jecs Corporation, Atsugi, Japan

[21] Appl. No.: 190,915

[22] Filed: Feb. 3, 1994

[30] Foreign Application Priority Data

Feb. 8, 1993 [JP] Japan .................. 5-003291 U

[51] Int. Cl.$^6$ ................ B60T 17/04; F16K 31/06
[52] U.S. Cl. .................. 303/119.2; 137/596.17; 251/129.02
[58] Field of Search ............. 303/119.1, 119.2, 303/84.2, 115.2; 137/596.17; 251/129.02, 129.15

[56] References Cited

U.S. PATENT DOCUMENTS

| | | | |
|---|---|---|---|
| 5,141,298 | 8/1992 | von Hayn et al. | 303/119.2 |
| 5,247,191 | 9/1993 | Kondo et al. | 303/119.2 X |

FOREIGN PATENT DOCUMENTS

| | | |
|---|---|---|
| 61-110654 | 5/1986 | Japan. |
| 64-48484 | 3/1989 | Japan. |

*Primary Examiner*—Josie A. Ballato
*Attorney, Agent, or Firm*—Bachman & LaPointe

[57] ABSTRACT

A solenoid valve for a antilock brake system comprises an electromagnetic coil part disposed on a housing, and a valve function part clearance-fitted in the electromagnetic coil part and hermetically received in a bore of the housing.

4 Claims, 4 Drawing Sheets

SOLENOID VALVES FOR ANTILOCK BRAKE SYSTEM

BACKGROUND OF THE INVENTION

The present invention relates generally to solenoid valves for a antilock brake system and more particularly, to solenoid valves of a type built in a housing.

One of the solenoid valves of this type is disclosed, for example, in JP-A 61-110654 in which a plurality of solenoid valves and safety circuit means for a antilock brake system (hereafter refer to as ABS) are disposed in parallel and built in a valve housing. Another is disclosed, for example, in JP-U 64-48484 in which a valve function part and a solenoid part of the solenoid valve are built in a housing.

With the above references, the solenoid valve includes an assembly of the valve function part and solenoid part built in the housing, which is fixed by an upper cover member, and the entirety of the solenoid valve undergoes through the valve function part brake pressure input from a master cylinder (M/C) due to pedal depression. Thus, the thickness, diameter, etc. of each part of the solenoid valve should be determined at sufficiently large values in view of the strength, obstructing a reduction in size of the solenoid valve.

It is, therefore, an object of the present invention to provide a solenoid valve for a antilock brake system which contributes to a reduction in size and manufacturing cost with easy assembling.

SUMMARY OF THE INVENTION

There is provided, according to the present invention, a solenoid valve for a antilock brake system, comprising:
- a housing having a hydraulic passage and a bore, said hydraulic passage and said bore communicating with each other;
- a valve function part hermetically fitted in said bore of said housing, said valve function part including an armature, a valve stem integrated with said armature, a spring for biasing said valve stem in one direction, a valve casing having a valve seat opened and closed by said valve stem, and a cover member for slidably holding said armature;
- an electromagnetic coil part engaged with said valve function part, said electromagnetic coil part being disposed on said housing, said electromagnetic coil part including a cap member, a box and a coil housed therein, said coil electromagnetically biasing said armature of said valve function part; and
- means for defining a clearance between said valve function part and said electromagnetic coil part.

DETAILED DESCRIPTION OF THE INVENTION

Figure 1A:
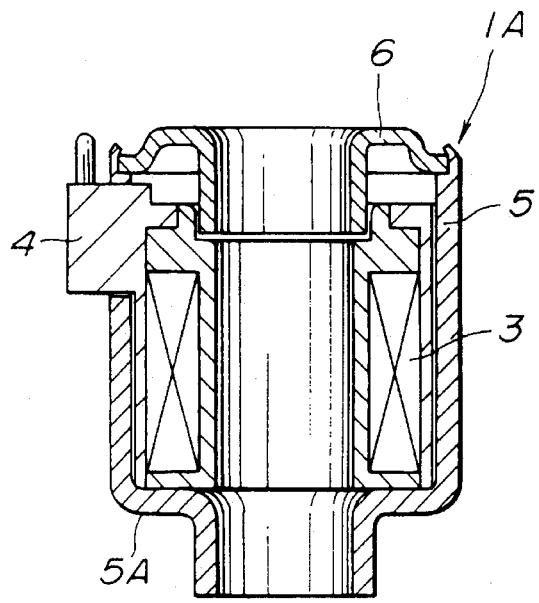
FIG. 1A is a longitudinal section showing an electromagnetic coil part of a first solenoid valve arranged in a main hydraulic passage.

Referring to the drawings wherein like reference numerals designate like parts throughout the views, referring first to FIGS. 1 and 2, a constitution of solenoid valves for ABS according to the present invention will be described. FIGS. 1A–1C show a constitution of a normally open solenoid valve (hereafter refer to as first solenoid valve) 1 arranged in a main fluid passage from M/C to a wheel cylinder (hereafter refer to as W/C), whereas FIGS. 2A–2C show a normally closed solenoid valve (hereafter refer to as second solenoid valve) 2 arranged in a return passage from W/C.

Figure 1B:
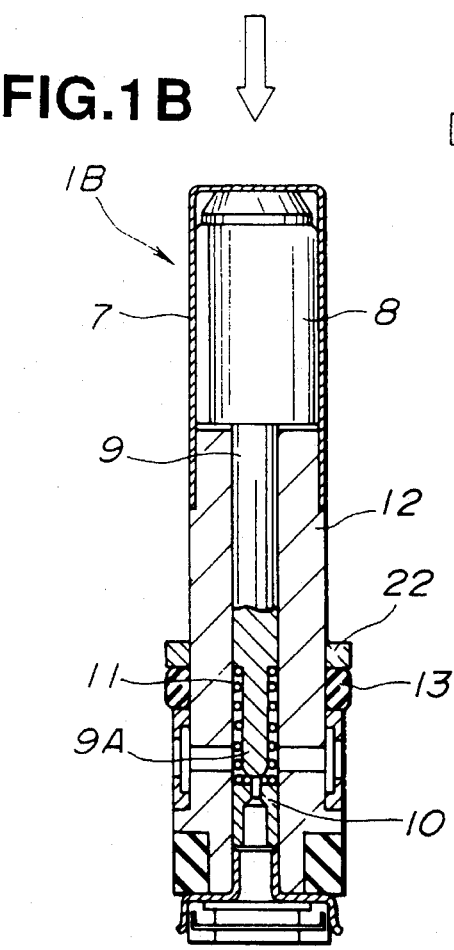
FIG. 1B is a view similar to FIG. 1A, showing a valve function part of the first solenoid valve.
Figure 1C:
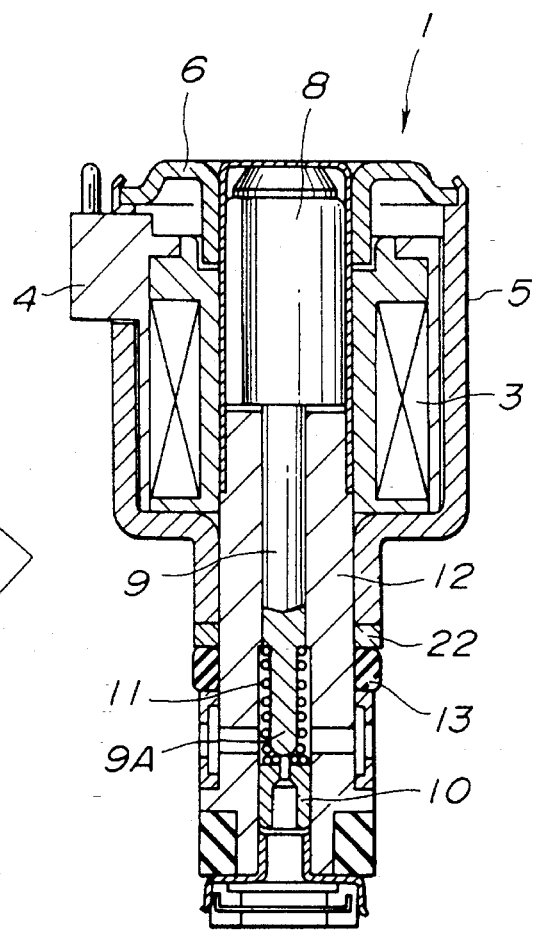
FIG. 1C is a view similar to FIG. 1B, showing the first solenoid valve.

The first solenoid valve 1 as shown in FIG. 1C is obtained by a clearance fit coupling of an electromagnetic coil part 1A as shown in FIG. 1A with a valve function part 1B as shown in FIG. 1B. Likewise, the second solenoid valve 2 as shown in FIG. 2C is obtained by a clearance fit coupling of an electromagnetic coil part 2A as shown in FIG. 2A with a valve function part 2B as shown in FIG. 2B. This clearance fit coupling is carried out with a clearance between, for example, 0.02 and 0.1 mm.

Referring to FIG. 1A, the electromagnetic coil part 1A is constructed so that a coil 3 and a coil terminal support part 4 are housed in a press-worked permeable box 5 and a cap member 6 which form an outer peripheral magnetic patio. Referring to FIG. 1B, the valve function part 1B includes a press-worked cylinder or cover member 7, a slidable armature 8, a valve stem 9 extending downward of the armature 8 and having a semi-spherical valve plug 9A at an end thereof, a spring 11 for holding the valve plug 9A away from a valve seat 10 through the valve stem 9, and a valve casing 12 for slidably holding the valve stem 9 and clearance-fitted in the box 5 of the electromagnetic coil part 1A. Additionally, a sealing member 18 is disposed at an outer periphery of the valve casing 12.

Figure 2A:
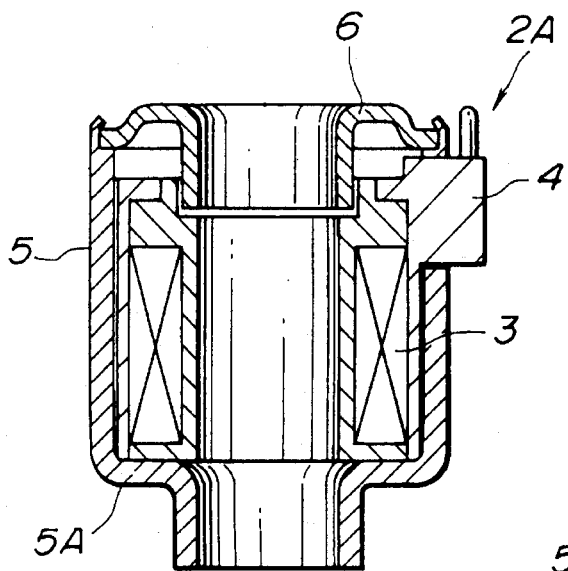
FIG. 2A is a view similar to FIG. 1C, showing an electromagnetic coil part of a second solenoid valve arranged in a return passage.
Figure 2B:
FIG. 2B is a view similar to FIG. 2A, showing a valve function part of the second solenoid valve.
Figure 2B:
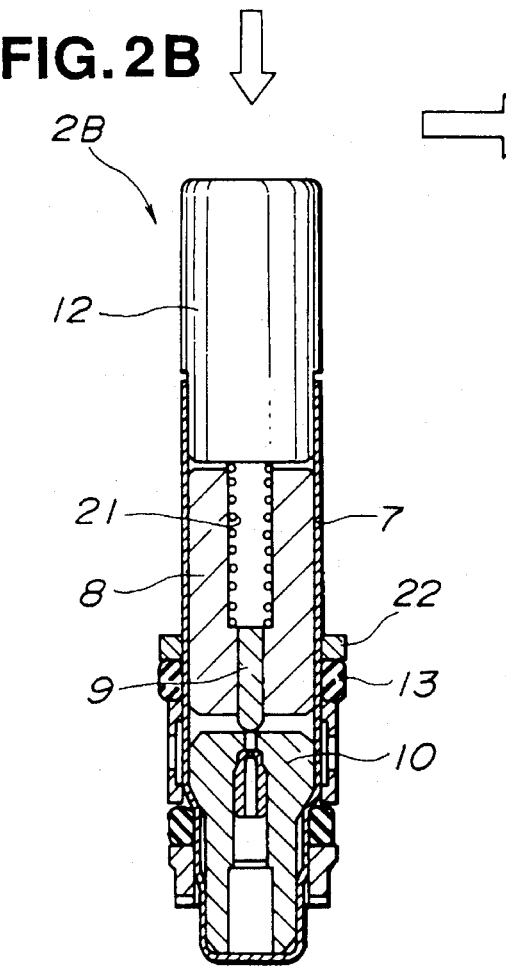
Figure 2C:
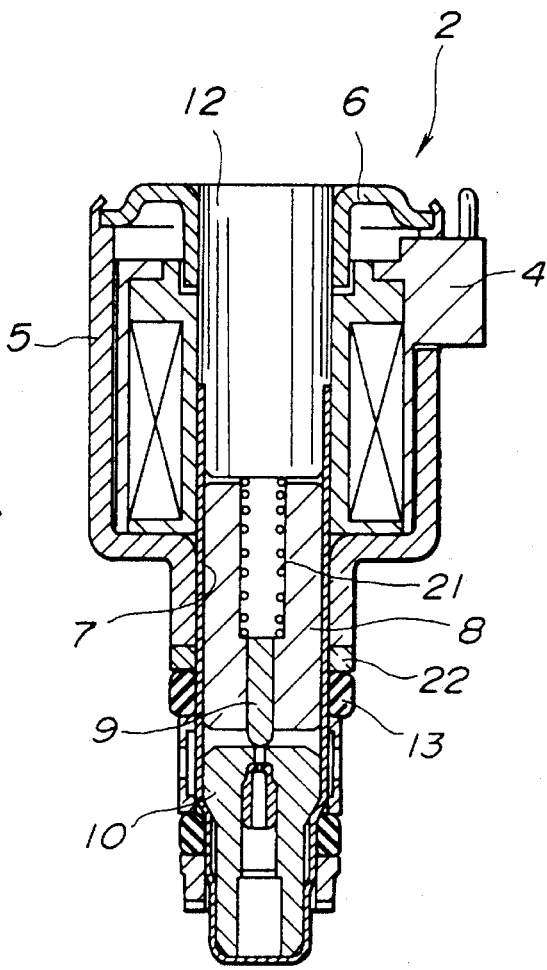
FIG. 2C is a view similar to FIG. 2B, showing the second solenoid valve.

A constitution of the second solenoid valve 2 as shown in FIGS. 2A–2C is substantially the same as that of the first solenoid valve 1 as shown in FIGS. 1A–1C except that a spring 21 serves to bias the armature 8 and the valve stem 9 toward to the valve seat 10.

Next, referring to FIGS. 3 and 4, a description will be made with regard to a procedure of assembling the solenoid valves 1, 2 for ABS in an actuator housing 31.

Figure 3:
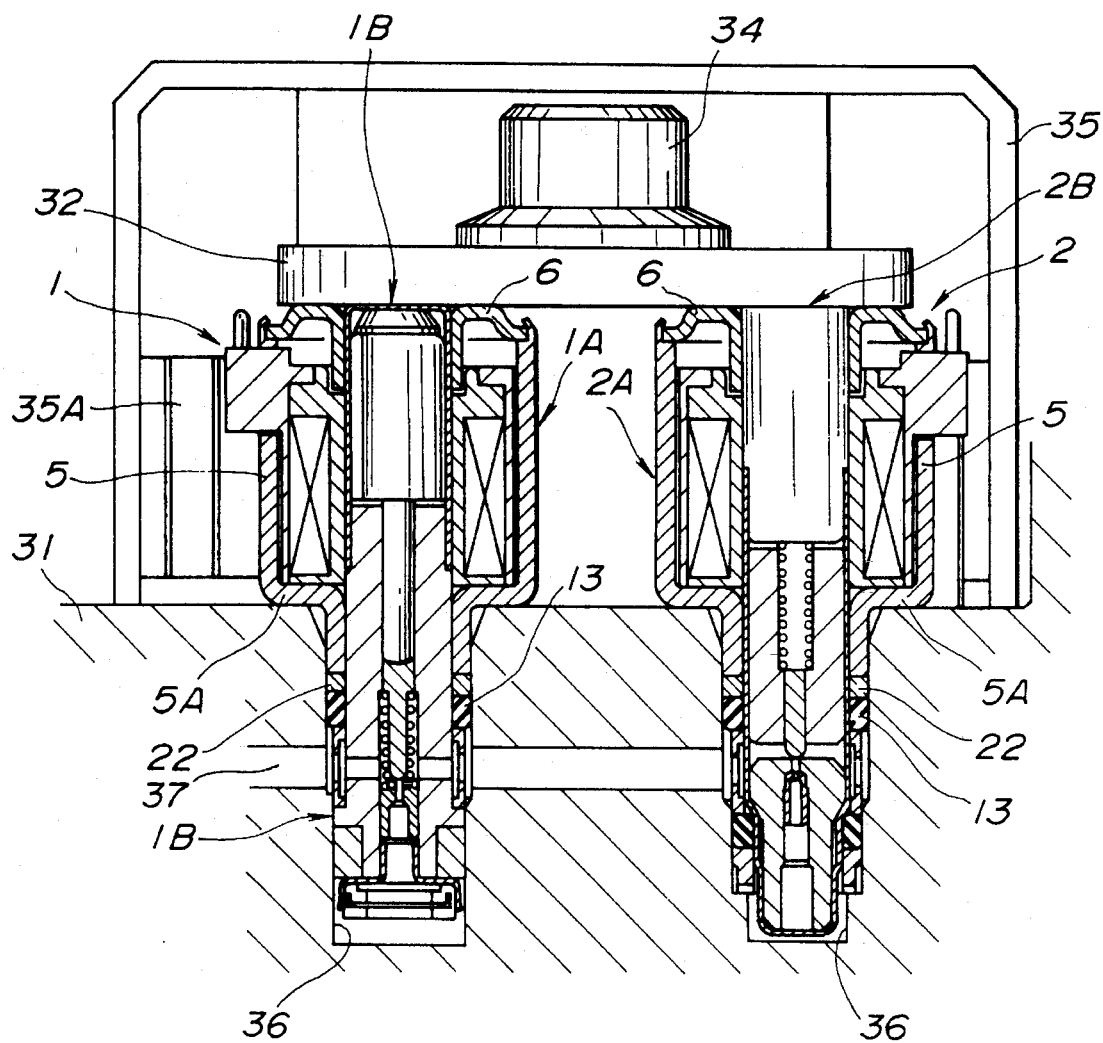
FIG. 3 is a fragmentary longitudinal section showing the first and second solenoid valves built in a housing.

First, referring to FIG. 3, the valve function part 1B of the first solenoid valve 1 and the valve Function part 2B of the second solenoid valve 2 are inserted into predetermined bores 36 of the actuator housing 31 together with sealing members 13, respectively, and positioned. Then, the valve Function parts 1B, 2B protruding from the actuator housing 31 are fitted into the electromagnetic coil parts 1A, 2A, a lower end of the box 5 of the electromagnetic coil part 1A, 2A abutting on a collar 22 of the valve function part 1B, 2B arranged at an outer periphery thereof, and a step portion 5A of the box 5 being held by an upper side of the actuator housing 31. In a state that the first solenoid valve 1 and the second solenoid valve 2 are built in the actuator housing 31, a holder plate 32 is disposed on the cap members 6 of the First and second solenoid valves 1, 2 so as to fix the two.

Figure 4:
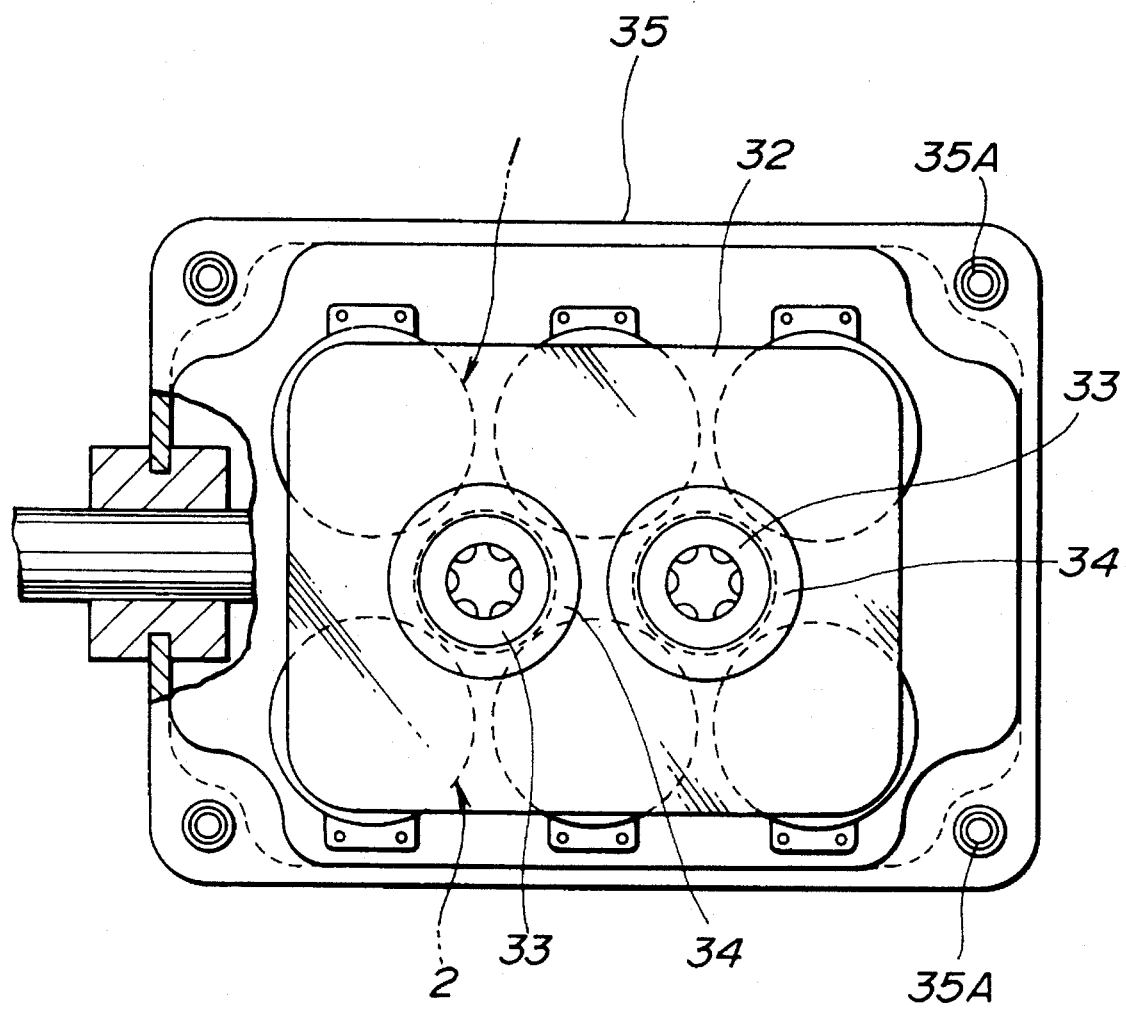
FIG. 4 is a plan view showing the first and second solenoid valves built in the housing.

Referring also to FIG. 4, collars 33 each having the height slightly greater than the height from the step portion 5A of the electromagnetic coil part 1A, 2A to a top face of the cap member 6 are engaged with bolts 34. The bolts 34 are tightened into the actuator housing 31 from a top of the holder plate 32, between valves 1 and 2. A cover 35 is arranged to protectingly conceal the entirety of a solenoid valve installed part of the actuator housing 31, and has bolt holes 35A in corners thereof for assisting in securing cover 35 to housing 31. Reference numeral 37 designates a hydraulic passage which communicates with the bores 36 of the actuator housing 31.

With the solenoid valves for ASS constructed as described above, the electromagnetic coil part 1A, 2A and the valve function part 1B, 2B are engaged with each other without any axial connection. Moreover, hydraulic pressure produced in M/C is received by the collar 22 of the valve function part 1B, 2B through the sealing member 13, having no effect on the entirety of the solenoid valve 1, 2.

What is claimed is:

1. A solenoid valve for an antilock brake system, comprising:

a housing having a hydraulic passage and a bore, said hydraulic passage and said bore communicating with each other;

a valve function part hermetically fitted in said bore of said housing, said valve function part including an armature, a valve stem integrated with said armature, a spring for biasing said valve stem in one direction, a valve casing having a valve seat opened and closed by said valve stem, and a cover member for slidably holding said armature; and an electromagnetic coil part detachably engaged with said valve function part, said electromagnetic coil part being disposed on said housing, said electromagnetic coil part including a cap member, a box and a coil housed therein, said coil electromagnetically biasing said armature of said valve function part.

2. A solenoid valve according to claim 1, wherein said box of said electromagnetic coil part has a lower end which abuts on a collar of said valve function part.

3. The solenoid valve according to claim 1, wherein said box of said electomagnetic coil part includes a lower end extending into said housing adjacent said valve function part, said valve function part including a collar which abuts said lower end such that hydraulic pressure produced in said valve assembly is received by said collar for blocking the effect of said pressure from the remaining portions of said valve assembly.

4. The solenoid valve according to claim 1, wherein said electromagnetic coil part and said valve function part are sized to have a clearance fit therebetween while detachably engaged for allowing ease of assembly and disassembly.

* * * * *